United States Patent [19]

Nussbaum

[11] Patent Number: 5,724,498
[45] Date of Patent: Mar. 3, 1998

[54] METHOD AND APPARATUS FOR CONCEALING CHARACTER MODIFICATIONS MADE FOR TEXT COMPOSITION PURPOSES

[75] Inventor: Nicholas I. Nussbaum, Seattle, Wash.

[73] Assignee: Adobe Systems Incorporated, San Jose, Calif.

[21] Appl. No.: 472,185

[22] Filed: Jun. 7, 1995

[51] Int. Cl.⁶ .................................................. B41J 19/58
[52] U.S. Cl. ...................................... 395/171; 395/781
[58] Field of Search .................................. 395/171, 793, 395/780, 781; 364/943.2, 943.44, 943.1

[56] References Cited

U.S. PATENT DOCUMENTS

| | | | |
|---|---|---|---|
| 3,785,258 | 1/1974 | Aron et al. | 396/553 |
| 4,054,948 | 10/1977 | Grier et al. | 364/900 |
| 4,057,849 | 11/1977 | Ying et al. | 345/193 |
| 4,193,071 | 3/1980 | Hasegawa et al. | 340/723 |
| 4,207,612 | 6/1980 | Grier et al. | 364/900 |
| 4,225,249 | 9/1980 | Kettler et al. | 400/3 |
| 4,523,294 | 6/1985 | Winn | 400/3 |
| 4,783,760 | 11/1988 | Carosso | 395/781 |
| 5,382,100 | 1/1995 | Sakuragi et al. | 400/9 |

OTHER PUBLICATIONS

"Adobe's 'Multimaster' Technology: Breakthrough in Type Aesthetics," *The Seybold Report on Desktop Publishing*, vol. 5, No. 7, Mar. 4, 1991.

*Primary Examiner*—Heather R. Herndon
*Assistant Examiner*—Sabrina Dickens
*Attorney, Agent, or Firm*—Fish & Richardson P.C.

[57] ABSTRACT

Disclosed is a text justification program (20) that runs on a computer (22) in accordance with the invention. The text justification program provides an improved method for justifying text by introducing random character modifications throughout the text so that characters modified for justification purposes do not stand out.

11 Claims, 7 Drawing Sheets

Dolor sit amet, consectetuer adipiscing elit, sed diam
nonummy nibh euismod tincidunt ut laoreet dolore magna
aliquam erat volutpat. Ut wisi enim ad minim veniam, quis
nostrud exerci tation ullamcorper suscipit lobortis nisl ut Figure 7a.  Ragged text with line breaks (prior art)

Dolor sit amet, consectetuer adipiscing elit, sed diam
nonummy nibh euismod tincidunt ut laoreet dolore magna
aliquam erat volutpat. Ut wisi enim ad minim veniam, quis
nostrud exerci tation ullamcorper suscipit lobortis nisl ut Figure 7b.  Justified, no letter space, first two lines have excessive word space. (prior art)

Dolor sit amet, consectetuer adipiscing elit, sed diam
nonummy nibh euismod tincidunt ut laoreet dolore magna
aliquam erat volutpat. Ut wisi enim ad minim veniam, quis
nostrud exerci tation ullamcorper suscipit lobortis nisl ut Figure 7c.  Justified, with letter space, first two lines letterspaced. (prior art)

Dolor sit amet, consectetuer adipiscing elit, sed diam
nonummy nibh euismod tincidunt ut laoreet dolore magna
aliquam erat volutpat. Ut wisi enim ad minim veniam, quis
nostrud exerci tation ullamcorper suscipit lobortis nisl ut Figure 7d.  Justified, with no letter space, first two lines expanded. (prior art)

Dolor sit amet, consectetuer adipiscing elit, sed diam
nonummy nibh euismod tincidunt ut laoreet dolore magna
aliquam erat yolutpat. Ut wisi enim ad minim yeniam, quis
nostrud exerci tation ullamcorper suscipit lobortis nisl ut Figure 7e.  Justified, with no letter space, first two lines expanded.
Expansion on randomly selected characters in last two lines.

METHOD AND APPARATUS FOR CONCEALING CHARACTER MODIFICATIONS MADE FOR TEXT COMPOSITION PURPOSES

FIELD OF THE INVENTION

The invention is directed toward computer programs having text-editing or display capabilities and, more specifically, to a method and apparatus for concealing character modifications made for text composition purposes using such programs.

BACKGROUND OF THE INVENTION

Text composition refers to the placement of characters and spaces on a line in order to produce text justification or "ragged" text. Text justification refers to the alignment of the endpoints of the lines of text with both the left and right margins of a column or a page of text to improve the readability of documents. Ragged text refers to lines of text in which one or both endpoints do not coincide with their respective margin. The typesetting and related industries have focused a significant amount of energy and resources into improving type aesthetics, including justification techniques.

Text justification has traditionally been accomplished by determining how many words will fit on a line of text, and then increasing the size of the spaces between words to align the left and right margins. If justifying a line of text would require very large word spaces, a small additional letter space was inserted between all of the characters of the line. A disadvantage of this text justification technique is that the spaces between words may become noticeably large, despite the use of letter spacing. A common occurrence stemming from the noticeable word spaces is undesirable visual artifacts known as "rivers" of white space, where the larger word spaces in bordering lines of text align vertically, forming meandering trails of word spaces throughout a paragraph of text. Another disadvantage of traditional text justification is that the word spaces may vary considerably in size from line to line, which is noticeable to a reader. Large word spaces are also preferably avoided because they are thought by some to decrease the readability of text. These disadvantages detract from the goal of text justification: to make text visually pleasing to the eye and, hence, more legible. For an example of this type of text justification, see FIG. 7B.

Publishers have struggled with solutions for minimizing the disadvantages of traditional text justification. In some cases, hyphenation has been used to decrease the amount of space that must be added to lines of text. However, the last word in a line of text that is especially problematic may not be susceptible to hyphenation. Moreover, frequent hyphenation is considered visually displeasing and makes the text hard to comprehend. For these and other reasons, hyphenation does not eliminate the problems discussed above.

With the advent of desktop publishing, typeface designers were given unprecedented freedom in designing fonts. Current font technology allows a user to create virtually infinite variations of font width and weight and to change the appearance of characters through scaling, using a single master typeface. This technology has been applied to text justification by expanding or contracting the characters themselves within a line to achieve text justification.

One technique of expanding or contracting characters is based upon traditional letter spacing techniques that were used in photomechanical processes in which the side bearings of an entire character is increased or decreased. See FIG. 7C for an example. Another technique anamorphically adjusts the width of type on each line by a constant proportion so that the word spaces need not be enlarged or reduced by large amounts. This, however, is undesirable in that a noticeable change in the thickness of the lines of the character, compared to the shape of the character, becomes apparent in the comparison of lines of text which have been scaled by different amounts.

More recently, several methods for creating characters have been developed which adjust the thickness of the lines of the character independent of the scaling of the width of the character. One proprietary process is Multi-Master™, created by Adobe Systems Incorporated, the assignee of the present invention. Additional information regarding Adobe's Multi-Master typeface process is described in U.S. patent application Ser. No. 08/291,602, entitled METHOD OF GENERATING MULTIPLE-MASTER TYPEFACES, which is hereby incorporated by reference. This and similar typefacing methods interpolate a character form from pairs of characters which have equal line thicknesses but varying widths. Other forms of character width modification exist which replace the shape of a character with another shape that represents the same character but that has a different width. Such processes have been used to adjust the characters in each line by applying a uniform modification to all the characters of the line, with considerable success. However, a disadvantage of this method is that lines that have been justified in this fashion may be noticeably different when compared with nearby or adjacent lines that have not been modified, or that have been modified with a different interpolation factor. An example of text justification using interpolation techniques is shown in FIG. 7D.

An improved method of justifying text that makes the justification more transparent to a reader would be extremely advantageous.

SUMMARY OF THE INVENTION

The invention is a method and apparatus for concealing character modifications made for text composition purposes. In one aspect of the invention, a method of text composition that minimizes the adverse effects of prior composition techniques by modifying characters for aesthetic purposes is disclosed. Specifically, the method is an improvement to text composition techniques that utilize character width modification to decrease the adjustments that need to be made to word and letter spaces in a line of text in order to achieve composition. The improved method comprises making character width modifications for aesthetic purposes to selected characters in a line of text without making character width modifications to other characters in the same line wherein the cumulative effect is to make the character width modifications for composition purposes seem less apparent while maintaining justification of the text.

In another aspect of the invention, the method includes: (a) composing a paragraph of text; (b) evaluating each line of text in the paragraph determine if character width modifications have been made for justification purposes; and (c) selecting characters to be subject to character width modifications for aesthetic purposes from only those lines of text in the paragraph that have not character width modifications for justification purposes. In another aspect, at least some of the selected characters to be subject to character width modifications for aesthetic purposes are selected randomly.

In other aspects of the invention, the character width modifications to selected characters for aesthetic purposes are accomplished by: (a) selecting a first character in the line of text; (b) selecting a second character in the line of text that is different from the first character; (c) modifying the width of the first character; and (d) modifying the width of the second character to compensate for the modification made to the first character. The first and second characters may be selected randomly or the selections may be based on criteria that makes the selections appear random.

In still further aspects of the invention, a method of composing characters forming words of a paragraph of text including lines of text marked by an endpoint is disclosed. The method comprises (a) adjusting the position of the endpoint of a first line of text in the paragraph to a target position, by one or more of: (i) adjusting the number of words on the line; (ii) modifying word spaces on the line; (iii) modifying character spaces on the line; and (iv) modifying the widths of the characters comprising the line of text; and (b) modifying the width of selected characters in a second line of text in the paragraph for aesthetic purposes without modifying the widths of other characters wherein the cumulative effect is to make the modifications made to the widths of selected characters in the first line of text in order to adjust the position of the endpoint of the first line to the target position seem less apparent.

In other aspect of the invention, a computer-readable memory that can be used to direct a computer to function in the manner described above is provided.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 7A illustrates a sample of text that has not been justified for use in comparison with the justification techniques described in FIGS. 7B–7E;

FIG. 7B illustrates justification of the sample text of FIG. 7A without the use of letter spaces or character width modifications;

FIG. 7C illustrates the justified text of FIG. 7B, with the addition of letter spaces on the first two lines of text;

FIG. 7D illustrates justification of the text of FIG. 7A, using interpolative expansion techniques on the first two lines of text; and FIG. 7E illustrates the justified text of FIG. 7D, wherein character width modifications have been made to randomly select the characters in the last two lines of text in accordance with the invention.

DETAILED DESCRIPTION OF THE PREFERRED EMBODIMENT

Figure 1:
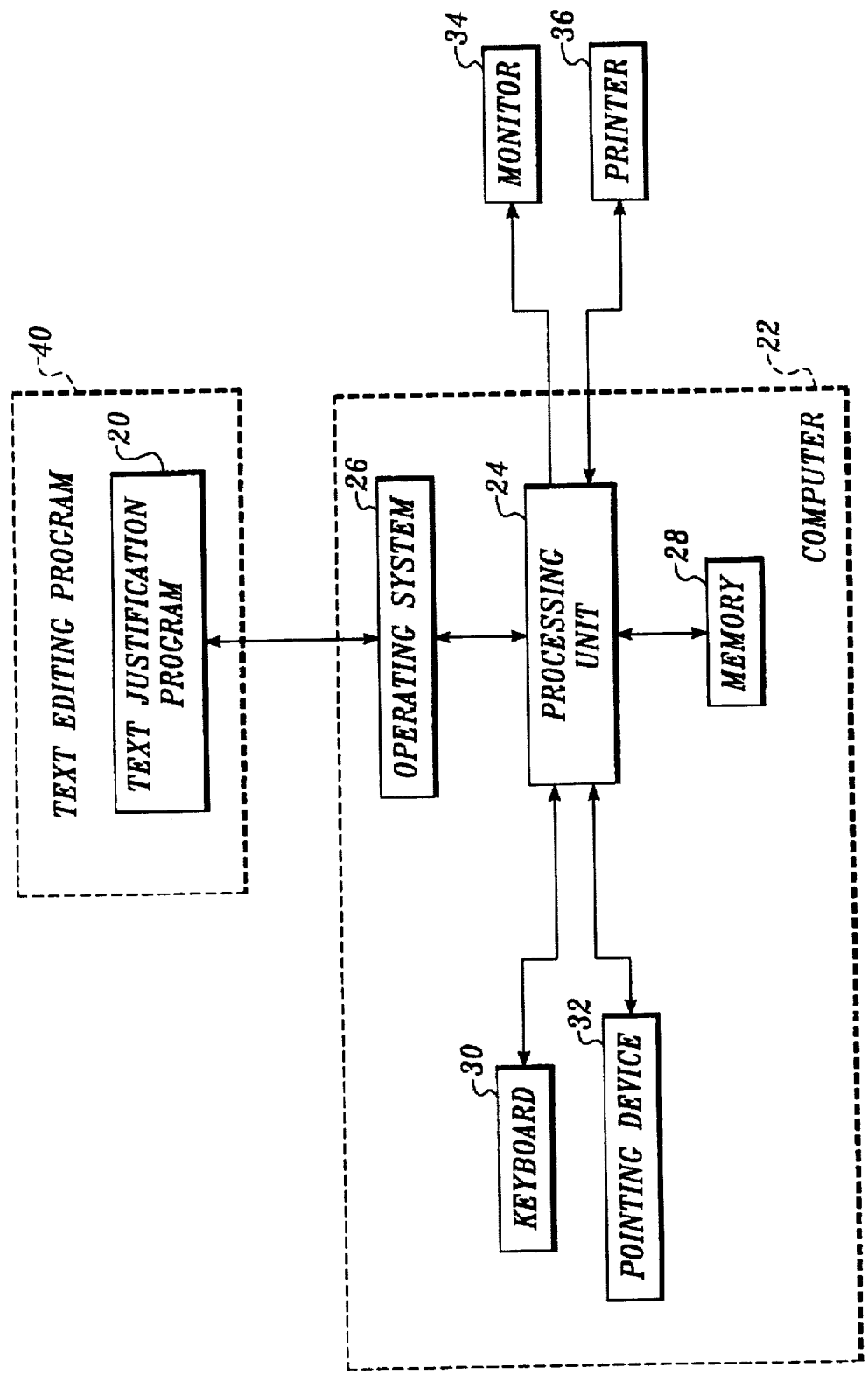
FIG. 1 is a block diagram of a text justification program in accordance with the invention.

A text justification program 20 in accordance with the invention is illustrated in FIG. 1. The text justification program runs on a computer 22 that includes a processing unit 24 controlled by an operating system 26, a memory 28, and a keyboard 30 and pointing device 32, such as a mouse, that are coupled to the processing unit for data input and computer control. A monitor 34 and printer 36 are also connected to the computer 22.

The memory 28 generally comprises, for example, random access memory (RAM), read only memory (ROM), and magnetic or optical storage media such as a hard drive, floppy disk, or magnetic tape. The computer 22 is typically a personal computer which may be, for example, a Macintosh™, International Business Machines (IBM™), or IBM-compatible personal computer. When used with IBM and IBM-compatible personal computers, the operating system 26 may be DOS based or may incorporate a windowing environment such as Microsoft Windows™ or OS/2™. The text justification program may, however, run on other types of computers, such as a mainframe or mini-computer, and other operating systems. Further, the text justification program 20 is typically incorporated into a larger program to accomplish a specific task, such as a word processing program 40, a desktop publishing program, or other program that has text-editing or display capabilities. Specifically, the text placement decisions made using the invention may be used to display text on a screen, mark text on a paper, or for producing photographic output (film). Moreover, it is important to note that the method discussed herein is not limited to justification per se, i.e., to making text flush with left and right margins. Specifically, character and word space width modifications may be used to adjust the position of words and spaces without justification, and the invention is advantageous to conceal these modifications.

Prior to discussing the invention in detail, a number of terms used throughout the Detailed Description are defined.

| TERM | DEFINITION OF TERM |
| --- | --- |
| Array A | Stores text from a paragraph, including characters and spaces. |
| Textpoint | A pointer used to show the current position in array A. |
| Text_length | The total number of characters and spaces in a paragraph of text, excluding spaces that may be present after the last character. |
| Line_start | Indicates the position of the beginning of a current line of text in array A. |
| Line_end | Indicates the end of a current line of text in array A. |
| Line_width | The width of the current line, including characters and spaces. |
| Line_letter | The number of characters in the current line of text. |
| Line_wordspace | The number of spaces in the current line of text. |
| Letter_count | The number of characters in a current line of text. |
| Letter_width | The width of the characters in a current line of text. |
| Space_count | The number of spaces in a current word. |
| Space_width | The width of the spaces in a current word. |
| Distribution | The amount of space that needs to be |

-continued

| TERM | DEFINITION OF TERM |
| --- | --- |
| | inserted into a line of text to justify the line. |
| Space_distribution | The total width to be added to word spaces in order to justify a line of text, up to a maximum value. |
| Letter_distribution | The total width gained by modifying letters to aid in justifying a line of text, either by adding letter spaces, through character modification, or both. |

Figure 2:
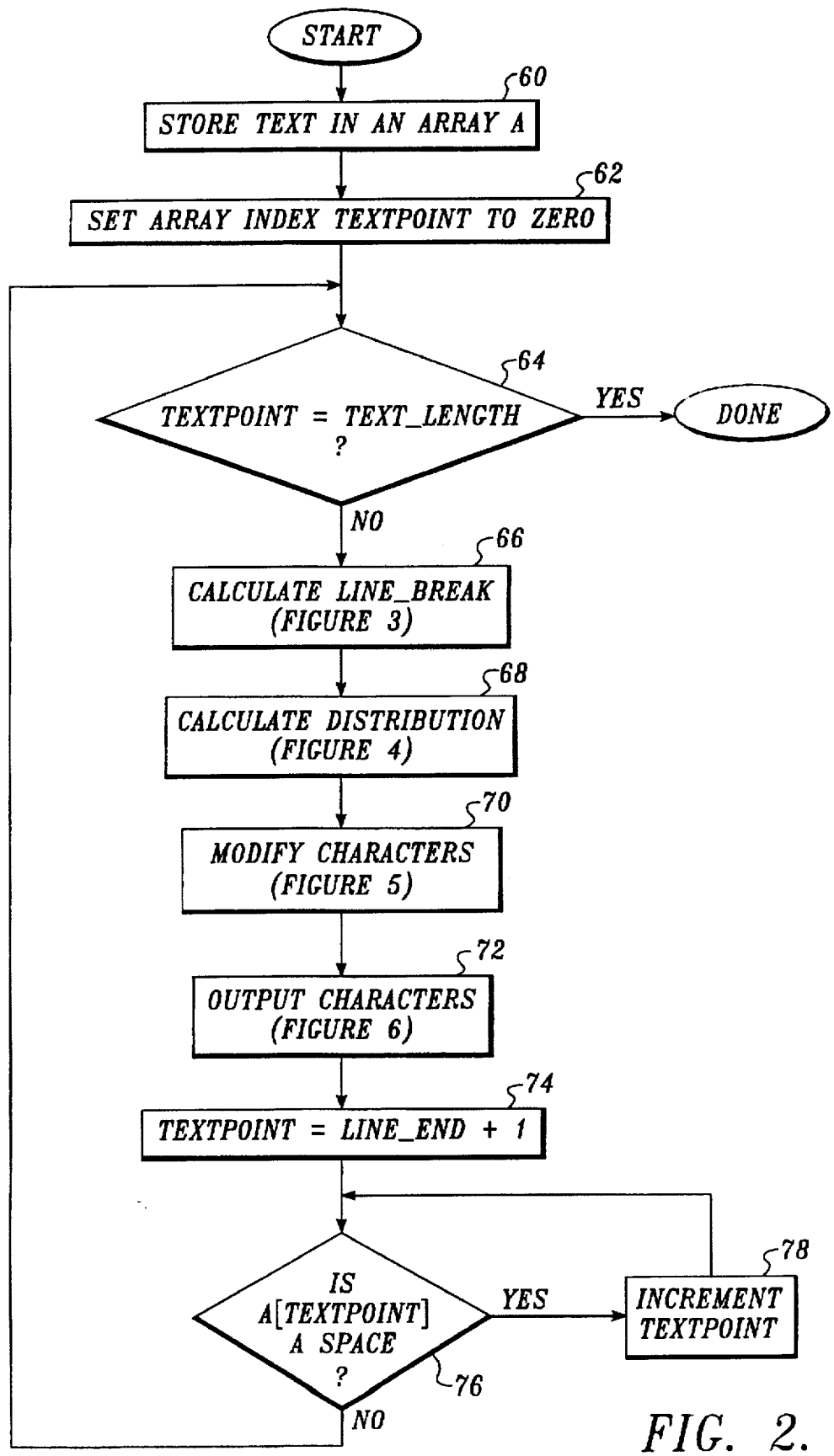
FIG. 2 is a flow chart illustrating an exemplary routine for implementing the text justification program in accordance with the invention.

FIG. 2 illustrates an exemplary routine for justifying a paragraph of text using the text justification program 20 in accordance with the invention. Those skilled in the art will appreciate that the routine of FIG. 2 may easily be adapted to justify the text comprising an entire document and that the routine is merely exemplary. Other complexities such as multiple fonts, hyphenation and in lines without suitable breaks are omitted for clarity. The routine assumes a paragraph of text to be justified has been identified. The routine invokes various subroutines, set forth in FIGS. 3–6, to accomplish its task. By way of an overview, a line break is first calculated between a current line of text and the next line of text. A distribution of words and characters within that line of text is then calculated. Thereafter, a character adjustment is calculated and the characters in the line are printed. The next line of text is then retrieved.

At block 60, the text from a paragraph to be justified is stored in an array A. At block 62, the array index textpoint is initialized to zero. At block 64, a test is made to determine if the variable textpoint is equal to the variable text_length. The two variables will be equivalent when the current paragraph of text has been justified by the text justification program. If this is the case, the routine terminates.

Figure 3:
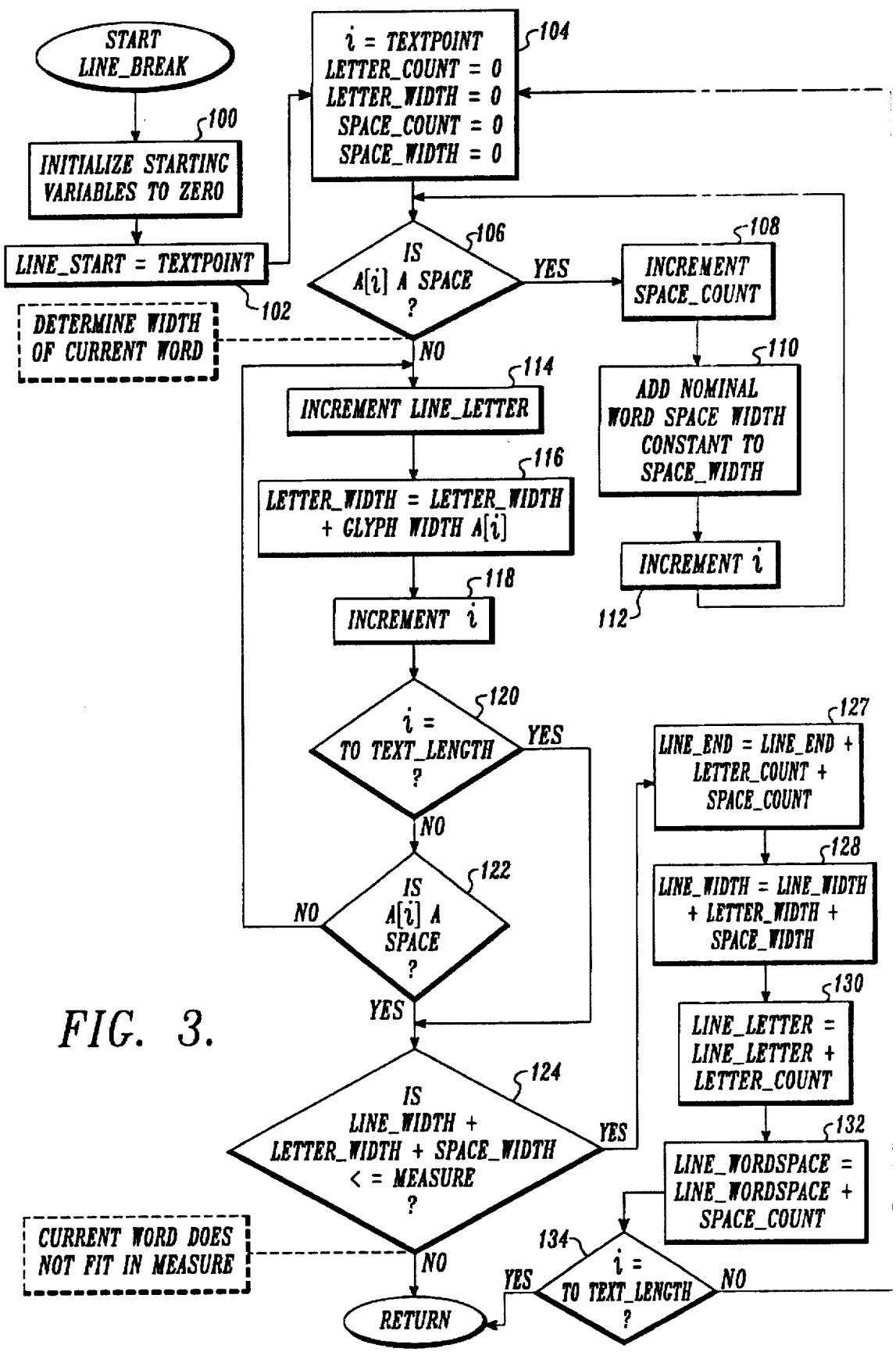
FIG. 3 is a flow chart illustrating an exemplary routine for finding a suitable break point in a paragraph of text that will be a justified line.
Figure 4:
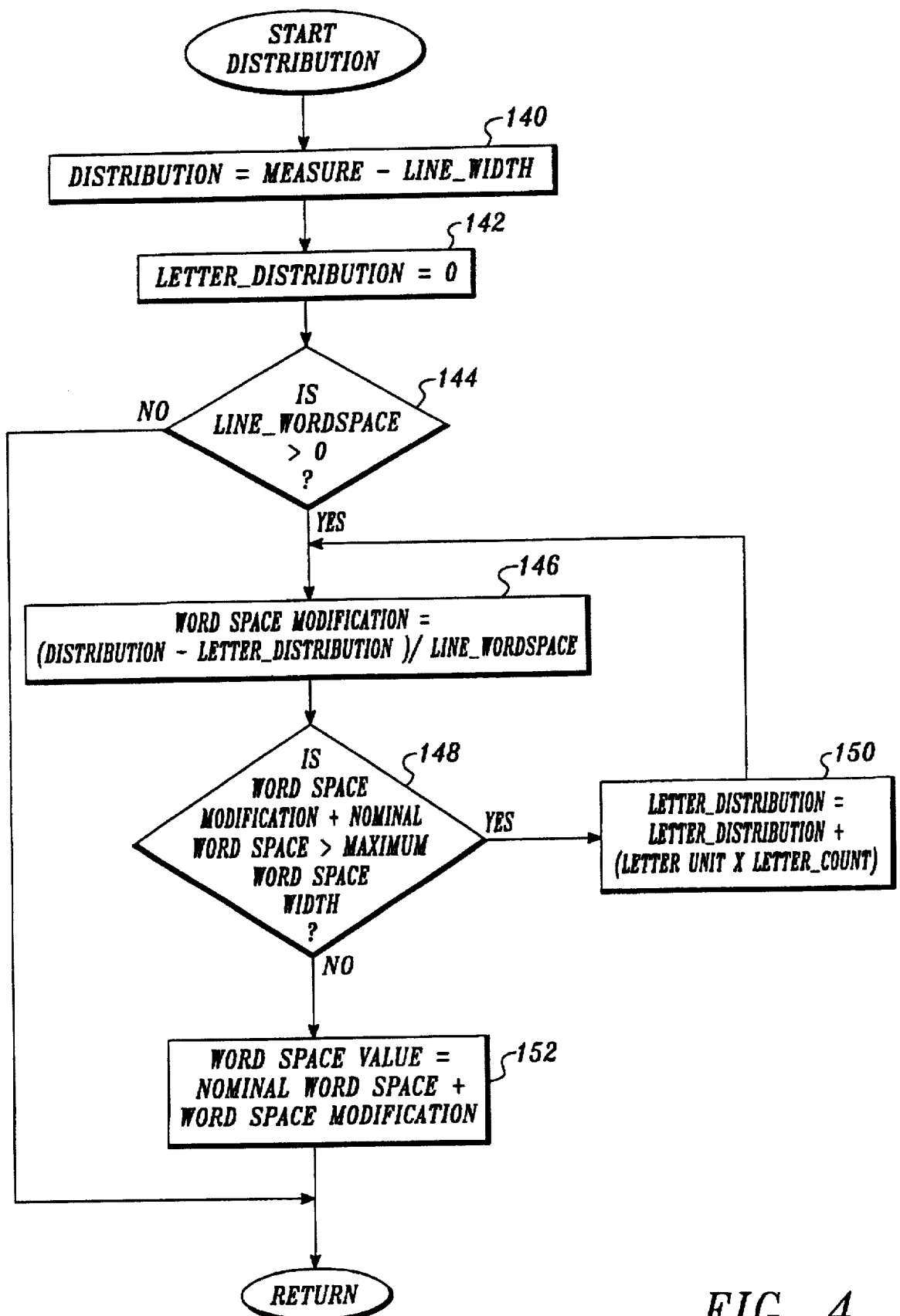
FIG. 4 is a flow chart of an exemplary routine for calculating the amount of space or distribution that must be added to a line of text to accomplish text justification.

Assuming that textpoint is not equal to text_length, at block 66 the routine line_break is called to retrieve a current line of text from the paragraph. A suitable routine for performing this task is illustrated in FIG. 3. After a line of text has been designated, the distribution for the line of text is calculated at block 68. The distribution of a line refers to the amount of space that must be added or subtracted from a line of text to accomplish justification. The distribution will be positive if space is being added, and negative if space is being subtracted from the current line. After the distribution has been determined, a calculation is made to determine if an adjustment to the characters in the line is necessary to add the distribution to the line. For example, character modification will be used if the space that must be added to justify a line of text is more than should be added by adjusting the word and letter spaces alone. A suitable routine for calculating the distribution and for calculating the character space and modification adjustment is illustrated in FIG. 4.

For clarity in the this discussion, the routines provided herein only address justification using expansion to add space. Those skilled in the art will appreciate the modifications that may be implemented to add compression techniques to the expansion routines disclosed and to compensate for short lines at the end of paragraphs. In addition, the routines do not differentiate between expansion added by letter space expansion and expansion added as a result of character shape modification, as this detail is not necessary to understand the invention.

Once the distribution has been calculated, a routine is called to select characters whose widths are to be modified for aesthetic purposes in accordance with the invention. A goal of the invention is make the modifications made to characters for justification less apparent, or even transparent, by randomly adjusting characters throughout a paragraph. After the character modifications have been calculated, a routine is called at block 72 to output the characters to a printer, monitor or other output device. A suitable routine for performing this task is illustrated in FIG. 6.

Figure 6:
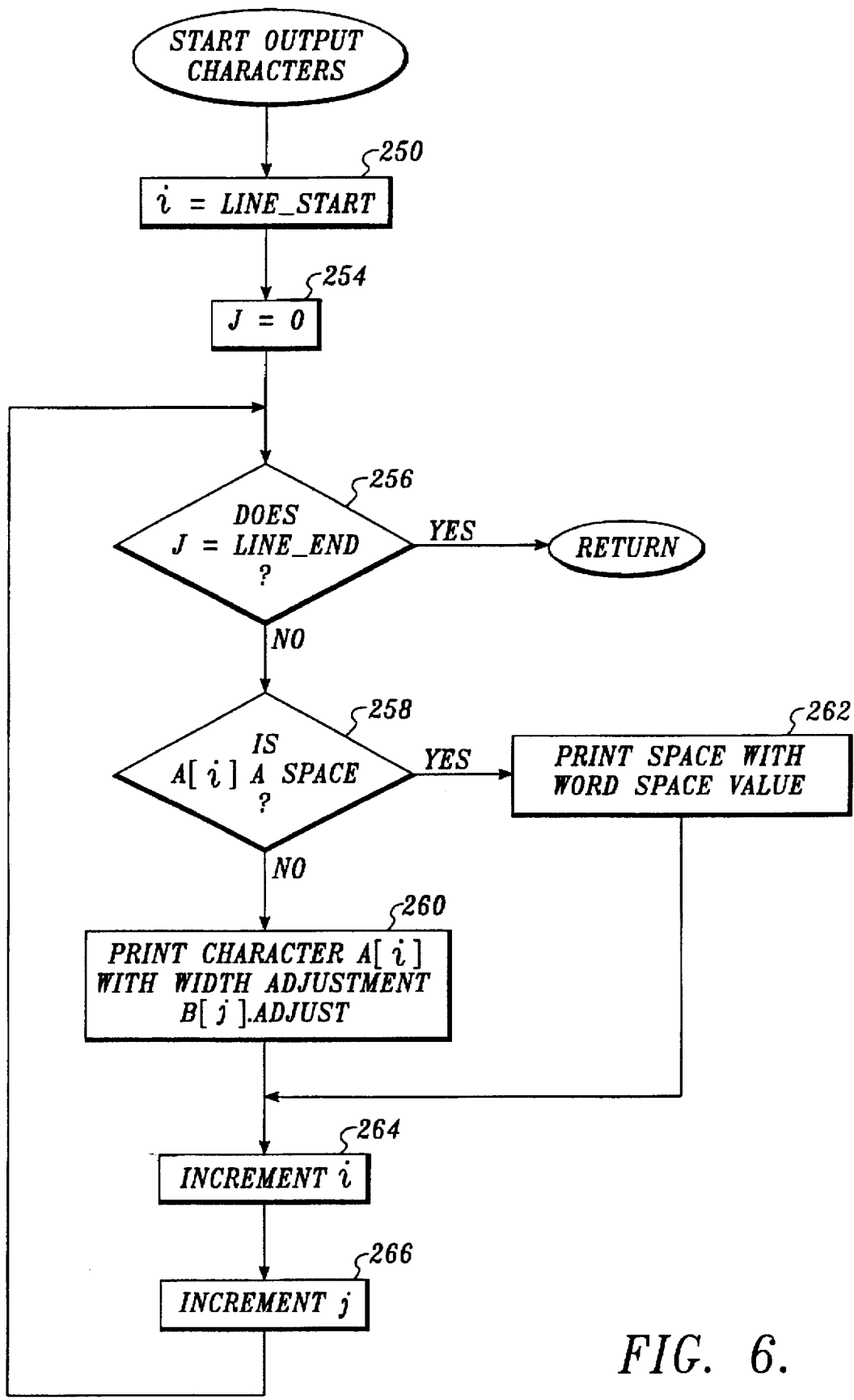
FIG. 6 is a flow chart of an exemplary routine for outputting characters after they have been modified by the character modification routine.

Upon return from the routine of FIG. 6, the variable textpoint is set equal to the variable line_end incremented by one, as shown at block 74. At block 76, a test is made to determine whether the pointer textpoint refers to a space or a character in the array A. If A[textpoint] is a space, the variable textpoint is incremented at block 78 and the routine loops until a character is found. Thus, blocks 76 and 78 will place textpoint at the position in array A corresponding to the first word in the next line of text to be justified, or to the end of the paragraph if all of the text has been justified. The program then loops to block 64. If, at block 64, the variable textpoint is found to be equal to text_length, the routine terminates. This is an indication that all the lines in the current paragraph of text have been considered.

With reference to FIG. 3, a suitable routine for determining an appropriate break for a current line of text in array A begins by initializing the following integer variables to zero: line_width, line_letter, and line_wordspace. This is accomplished at block 100. At block 102, the variable line_start is set equal to textpoint. At block 104, index i is set equal to textpoint; and the variables letter_count, letter_width, space_count, and space_width are set equal to zero.

At block 106, a test is made to determine whether A[i] is a space. If the location in array A referred to by index i is a space, the variable space_count is incremented at block 108; a nominal word space width constant is added to the variable space_width at block 110; and i is incremented at block 112. The routine then loops to block 106. The nominal word space width is the default distance occupied by a space marker in the text of array A prior to any manipulation of the word spaces in the paragraph of text.

If A[i] is not a space, a character is assumed to be in that position, and the variable line_letter is incremented, as shown at block 114. At block 116, the glyph width of A[i] is added to the current value of letter_width. A glyph is a graphical image that represents a character. The glyph width for a given character will depend upon the font used. Once the glyph width has been added, the index i is incremented at block 118.

At block 120, a test is made to determine whether the index i is equal to the length of the paragraph, i.e., the variable text_length. If the end of the paragraph has not been reached, a test is made at block 122 to determine whether A[i] is a space. If the location in array A designated by index i is not a space, the routine loops to block 114. On the other hand, if the end of the paragraph has been reached according to the test at block 120, or if the current location of array A is a space (indicating that the end of a word has been found), a test is made at block 124 to determine if adding the current word will make the current line too long to fit within the measure, i.e., the distance between the left and right margins of the page. Specifically, a test is made to determine whether the sum of the line_width+letter_width+space_width is less than or equal to the measure. Having the sum of all these variables be less than the measure indicates that the current word will fit on the current line.

At block 127, the variable line_end is increased by the letter_count plus the space_count, thereby adding the number of spaces between the current and former words, as well as the number of characters in the current word, to the line. At block 128, the variable line_width is increased by the letter_width plus the space_width, thereby adding the space occupied by the current word to the line. At block 130, the value of the variable line_letter is increased by the value of letter_count, thereby adding the number of characters in the current word to the total number of characters in the current line. The value of line_wordspace is then augmented at block 132 by the value of space_count, thus adding the number of spaces between the former word and the current word to the total word space count for the line. At block 134, a test is made to determine whether the index i is equal to the length of the paragraph, i.e., the variable text_length. If the end of the paragraph has not been reached, the routine loops to block 104. If the end of the paragraph has been reached, the routine returns to block 68 of FIG. 2.

If, according to the test at block 124, the sum of line_width, letter_width and space_width was greater than the measure, the current word will not fit on the current line, and since compression is not allowed in this exemplary routine, the routine returns without adding that word to the line. This word will then become the first word in the next line of text. Details of omitting the word space between two lines are apparent to those skilled in the art and are not shown. The routine also omits treatment of a special case where a single word will not fit on a line of text, e.g., because the word contains too many characters to fit within the specified margins. Upon return to the routine at FIG. 2, the distribution or amount of space that must be added to the current line of text is calculated using the routine of FIG. 4.

At this point in the routine of FIG. 2, the groundwork has been laid out to justify the current line of text. Text justification will occur in one of the following ways:

(1) by doing nothing, i.e., if the characters and spaces of the current line equal the measure;

(2) by adjusting, i.e., increasing or decreasing the space between words in the current line, without changing the space between letters or the widths of the characters themselves; or (3) by adjusting the space between words in the current line, adjusting the space between letters in the current line, adjusting the widths of the characters in the line, or by utilizing a combination of two or all three of these options.

It will be recognized that character modification will sometimes be needed to properly justify a line. In the case of contraction, the characters may be made smaller to accommodate all of the text slated for a line, while still allowing at least a minimal space between word and letters. In the case of word space expansion, character modification may be needed to avoid large spaces between words in a justified line, multiple spaces between letters in words on the line, or the creation of "rivers" in a paragraph of text.

With reference to FIG. 4, at block 140 the distribution, or amount of space to be added to the current line, is set equal to the difference between the measure and the line_width. A positive value is indicative of adding space. In an alternative embodiment of the invention, a negative value for the distribution may be used to accomplish text compression. At block 142, the variable letter_distribution is initialized to zero. At block 144, a test is made to determine if there are any spaces in the current line of text, i.e., whether the variable line_wordspace is greater than zero.

Assuming there are spaces in the current line of text, the word space modification for the current line of text is set equal to: (distribution—letter_distribution) divided by line_wordspace, as indicated at block 146. Thus, the word space modification is an indication of the amount of space that needs to be added between each word in the current line of text to justify the line. A test then is made at block 148 to determine if the (word space modification plus the nominal word space) is greater than the maximum word space width or, in other words, the maximum space allowed between two adjacent words in the current line of text.

If the sum of the word space modification and nominal word space is less than the maximum space allowed between adjacent words, the word space value is set equal to the nominal word space plus the word space modification, as shown at block 152. In this case, the current line of text can be justified by modifying the space between words alone, and character modification is not necessary for the purpose of adding space to the line. In contrast, if the word space modification is greater than the maximum, at block 150 the variable letter_distribution is augmented by a unit of expansion for each character ("letter unit") multiplied by the number of characters in the line, i.e., the letter_count. As is discussed below, the letter unit expansion will be accomplished through letter space expansion, character width modification, or both. A "letter unit" may be a mil, one-half-mil, 1/72 of an inch, or another quantity and will be determined, in part, by the resolution of the output device. For example, an imagesetter will likely be able to print a finer resolution than a composite printer, and the unit value used for each may be adjusted accordingly by the text justification program. In another embodiment, the user can select the quantity desired for this variable based on a fraction of the size of the characters.

The routine then loops to block 146, where the word space modification is recalculated, and the test of block 148 is re-evaluated. As long as the test at block 148 indicates that the word space modification is too great, letter units will be added incrementally to the characters by looping around blocks 146–150. Once the word space modification is less than the maximum word space width, as tested at block 148, or if the word space modification was less than or equal to the maximum word space width at the outset, the routine continues at block 152.

Figure 5:
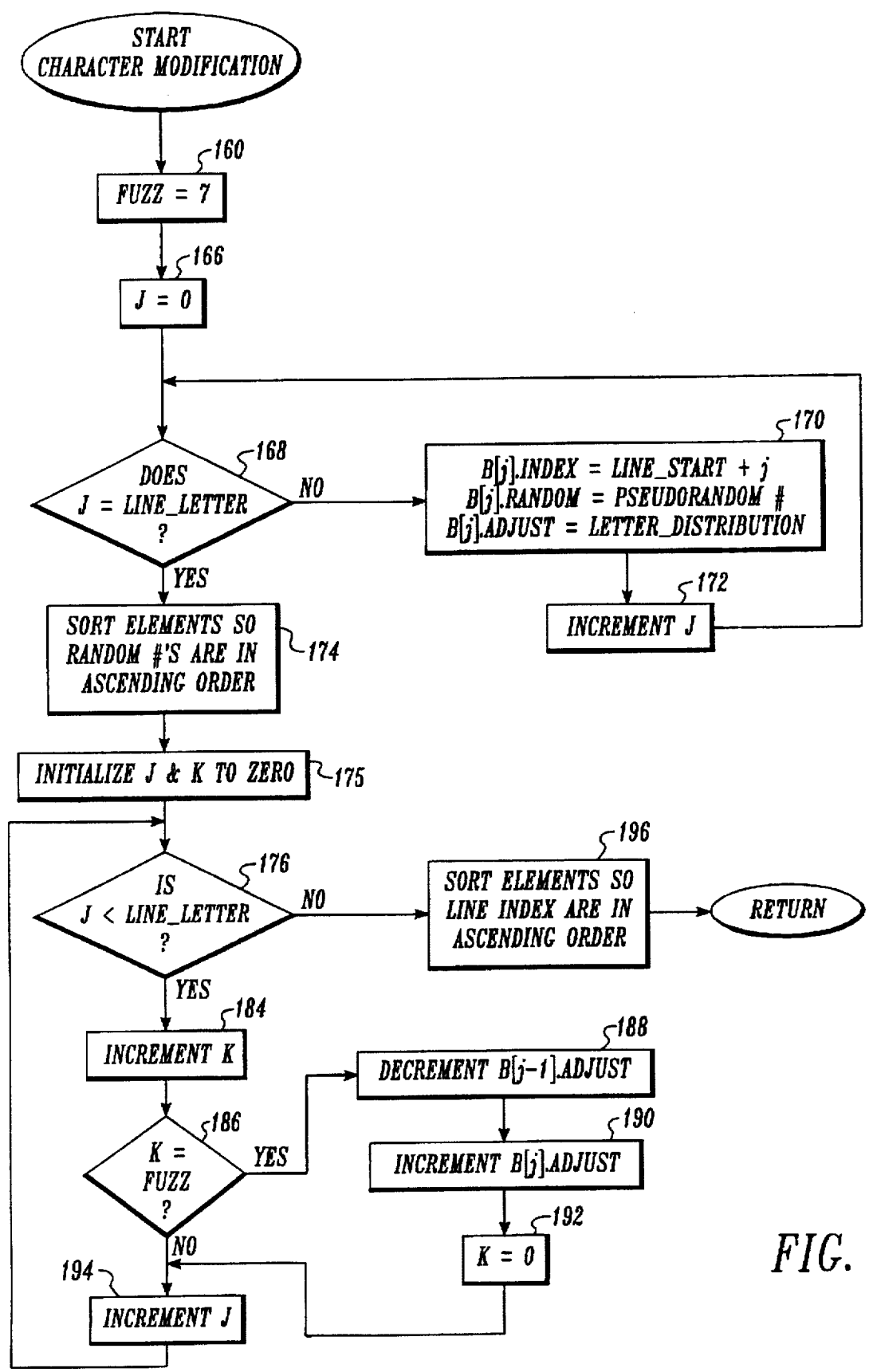
FIG. 5 is a flow chart of an exemplary routine for randomly changing various characters in the line of text for visual effect.

At block 152, the variable word space value is set equal to the nominal word space value plus the word space modification. Thus, the distance between each word in the line is established. Once the word space value has been computed, or if it was determined in the test at block 144 that there are no workspaces in the current line, the routine returns to block 70 of FIG. 2. At block 70, a routine to calculate the character adjustment is invoked. This routine is shown in FIG. 5.

It is noted that blocks 148–152 address the case where the distribution is positive, and thus space is being added to the line of text. Those skilled in the art will appreciate that minor modifications can be made to adapt the routines shown to take into account negative distribution values as well. These modifications have been omitted for simplicity.

The inventor has recognized that if only those characters that are needed to achieve justification are modified, these characters may stand out. One situation, for example, is where the justification for a single line in a paragraph required character modification, and the other lines were able to be justified using only space modifications. In this instance, the difference in the characters of the single line may be quite noticeable.

To minimize the adverse effects of using character modification to justify text in accordance with the invention, the text justification program will randomly select characters throughout a paragraph of text and modify those characters in order to achieve the appearance of randomness in the modification of characters. In this manner, because of the random nature of the changes, a user's eye is less likely to pinpoint specific instances of character modification resulting from the need to justify a line. Within the specification and throughout the claims, the phrase "randomly selected" is defined as selecting one of a set with equal probability that any member of the set is selected. In an alternate embodiment, the characters are selected based on criteria that will give the appearance of randomness to the eye.

FIG. 5 is an exemplary routine for randomly modifying characters in accordance with the invention. A variable called "fuzz" relates to the number of characters that are to be modified. Specifically, in the embodiment of the text justification program described in FIG. 5, the variable fuzz specifies that for every Nth character, two randomly selected characters will be modified. Thus, if the fuzz is set equal to seven as shown in block 160, approximately two of every seven characters in the current line of text is selected for modification. This will become more apparent from the description that follows.

The specifications for an array B of elements are defined at blocks 166–172. Specifically, each element in the array B has the following attributes: (1) an index to a specific character or space in the current line of text; (2) a random number from zero to one; and (3) an "adjust" value that is indicative of the modification, if any, to be made to that character. The array B provides an exemplary method of modifying characters in the current line in a random fashion. Those skilled in the art will recognize that there are many other ways of accomplishing this same task, such as randomly selecting characters until an unmodified character is obtained.

At block 166, the variable j is set equal to zero. A test is made at block 168 to determine if the end of the current line of text has been reached, i.e., to determine if j is equal to the variable line__letter. If the end of the current line of text has not been reached, the following variables are set at block 170:

B[j].index=line__start+j;

B[j].random=a pseudo random number; and

B[j].adjust=letter__distribution.

At block 172, the variable j is incremented by one, and the routine loops to block 168. Thus, blocks 168–172 store each character and space in the current line of text into the array B, along with a random number and an adjust value that is associated with that character or space. Once the array B has been set up, at block 174, the elements in array B are sorted into ascending order by the random numbers. This may be accomplished using any of a number of sorting routines known to those skilled in the art. At block 175, variables j and k are initialized to zero.

At block 176, a test is made to determine if j is less than line__letter, i.e., if all the characters and spaces in the current line have been processed. If the end of the current line has not been reached, the variable k is incremented at block 184. A test is then made at block 186 to determine if k is equal to the variable fuzz, i.e., indicating that the Nth unmodified character or space has been located in array B. If k is equal to the variable fuzz, the adjust value for the character/space B[j-1] is decremented at block 188; and the adjust value for the character/space B[j] is incremented at block 190. At block 192, k is set equal to zero.

The variable j is incremented at block 194 if k has been set equal to zero at block 192, or if k was not equal to the variable fuzz according to the test at block 186. The routine then loops to block 176, where a test is again made to determine if the end of the current line has been reached. If the end of the current line has not been reached, the loop comprising blocks 176–194 repeats. Once the end of the current line has been reached, the elements in array B are sorted so that the line indexes are in ascending order, as shown at block 196. The routine then returns to block 72 of FIG. 2, where a routine for outputting the characters in the line is called.

FIG. 6 illustrates an exemplary routine that may be used to output characters to a printer, monitor or other output device after the characters of a line have been manipulated to provide text justification and random modifications in accordance with the invention. At block 250, the variable i is set equal to the start of the current line of text, i.e., line__start. Variable j is then initialized at block 254. A test is made at block 256 to see if the end of the line has been reached, i.e., if j is equal to line__end. If the end of the current line has not been reached, a test is made at block 258 to determine if A[i] is a space. If the location of array A designated by the variable i is not a space, the character in that location is printed along with its modification adjustment at block 260. If A[i] was a space, the space is printed in accordance with the word space value at block 262.

Once either a space or a character has been printed, variables i and j are incremented at blocks 264 and 266. The routine then loops to block 256 where a test is again made to determine whether the end of the current line has been reached. If the end of the current line has not been reached, the routine loops to block 258. If the end of the current line has been reached, the routine returns to block 74 of FIG. 2. At the routine of FIG. 2, the appropriate steps are taken to determine if any additional lines of text remain in the current paragraph, or if all of the lines in the current paragraph have been evaluated, justified, and printed or displayed.

FIGS. 7A–7E illustrate the justification of a paragraph of text and may be helpful in understanding the invention. Specifically, FIG. 7A illustrates a text sample that has not been justified. The text includes ragged line breaks at its right margin. In FIG. 7B, the same text has been justified using word space justification techniques only. Thus, there are no letter space or character modifications in this justification. The excessive word space in the first two lines of the sample text is noted.

In FIG. 7C, the first two lines in the sample text of FIG. 7B have been justified using both word space and letter space justification techniques. In FIG. 7D, both interpolation and word space techniques have been used to justify the first two lines of the sample text. As described in the Background of the Invention section, each of the justification techniques shown in 7A–7D are known in the prior art.

With reference to FIG. 7E, the invention has been used on the last two lines of the sample text of FIG. 7D. Specifically, randomly selected characters in the last two lines of text have been expanded in order to make the expansion techniques in the first two lines of text be less apparent.

As will be appreciated from the foregoing, the invention provides an improved method for justifying text by introducing character modifications throughout a document so that characters modified for justification purposes do not stand out. While the preferred embodiment of the invention has been illustrated and described, it will be appreciated that various changes can be made therein without departing from the spirit and scope of the invention. For example, the method may be enhanced by weighting the probability of selection of the characters according to other criteria, so that particular characters are less likely to be selected or may never be selected. The method may also be enhanced to recognize certain situations and select characters to be modified algorithmically, but using algorithms whose function presents a random appearance.

Examples of such weighted selection criteria include preferentially selecting characters in which the width modification is considered less noticeable—an "H" may be selected with much higher probability than a period. As an alternative, the method may preferentially select characters which appear multiple times in the line and which have already been modified. As another alternative, the method may be adapted to reduce the probability of selecting characters which occur frequently in the same line or adjacent lines in order to avoid having variations of the same character occurring near each other. In another embodiment, the method is adapted to preferentially select combinations of two or more adjacent characters to be modified; where some or all of characters in the combination may be modified in width.

In another embodiment, adjustments to character widths may be compensated by adjusting the width of word spaces.

The embodiments of the invention in which an exclusive property or privilege is claimed are defined as follows:

1. A computer-implemented method of composing a line of text to improve the appearance of a page of text in which the line of text occurs, comprising:

storing in a computer memory a line of text having characters and an original shape and width associated with each character;

applying a preprogrammed strategy to select some, but not all, of the characters in the stored line of text for modification, according to a pattern that makes the selections appear random;

adjusting the width associated with each selected character in the stored line of text by modifying the shape of the selected character; and composing the stored line of text using the adjusted width for each selected character and the original width for each remaining character in the stored line of text.

2. The method of claim 1 further comprising:

storing in the computer memory a target length for the line of text;

determining a length of the line of text;

determining the difference between the length of the line of text and the target length;

wherein in the step of adjusting character widths, widths are chosen for the selected characters to decrease the difference between the length and the target length.

3. The method of step 2 further comprising:

decreasing the difference between the length and the target length by one or more steps selected from the group consisting of i) adjusting the number of words on the line, ii) adjusting word spaces on the line, iii) adjusting character spaces on the line, and iv) adjusting the shape and width of every character.

4. The method of claim 1 further comprising:

increasing the width of some of the selected characters in the line of text while decreasing the width of others of the selected characters in the line of text so as to substantially maintain the length of the line of text.

5. The method of claim 1 wherein the computer-generated pattern is random.

6. The method of claim 1 wherein the computer-generated pattern is based on criteria to make the selections appear visually random.

7. The method of claim 1 further comprising:

producing the line of text on an output device.

8. The method of claim 1 wherein the heights of the selected characters are not adjusted.

9. A computer-implemented method of composing a line of text to improve the appearance of a page of text in which the line of text occurs, comprising:

storing in a computer memory a line of text having characters, an original shape and width associated with each character, and a target length;

determining the difference between the length of the line of text and the target length;

applying a preprogrammed strategy to select some, but not all, of the characters in the stored line of text for modification, according to a pattern that makes the selections appear random;

adjusting the width associated with each selected character by modifying its shape to decrease the difference between the length and the target length; and composing the line of text using the adjusted width for each selected character and the original width for each remaining character in the stored line of text.

10. A computer-implemented method of composing a paragraph of text to improve the appearance of a page of text in which the paragraph of text occurs, comprising:

storing in the computer memory a paragraph of text having a plurality of lines of text, each line of text having characters, an original shape and width associated with each character, and a target length;

determining a length of a first line of text;

determining the difference between the length and the target length of the first line of text;

adjusting the width of every character in the first line of text to decrease the difference between the length and the target length of the first line of text;

determining a length of a second line of text;

applying a preprogrammed strategy to select some, but not all, of the characters in a second, different line of text for modification, according to a pattern that makes the selections appear random;

increasing the width of at least one of the selected characters while decreasing the widths of at least one other of the selected characters in the second line of text by modifying the shapes of the selected characters so as to substantially maintain the length of the second line of text; and composing the paragraph of text using the adjusted widths for the characters on the first line of text and the increased and decreased widths for the selected characters and the original widths for the remaining characters in the second line of text in the stored paragraph.

11. A computer program, tangibly stored on a computer-readable medium, comprising instructions for causing a computer to:

store in a computer memory a line of text having characters and an original shape and width associated with each character;

apply a preprogrammed strategy to select some, but not all, of the characters in the stored line of text for modification, according to a pattern that makes the selections appear random;

adjust the widths associated with the selected characters in the stored line of text by modifying the shapes of the selected characters; and compose the stored line of text using the modified shapes and adjusted widths for the selected characters and the original shapes and widths for the remaining characters in the stored line of text so as to improve the appearance of a page of text in which the line of text occurs.

* * * * *